L. RENAULT.
TRANSMISSION GEARING.
APPLICATION FILED JULY 20, 1910.
1,033,618.
Patented July 23, 1912.
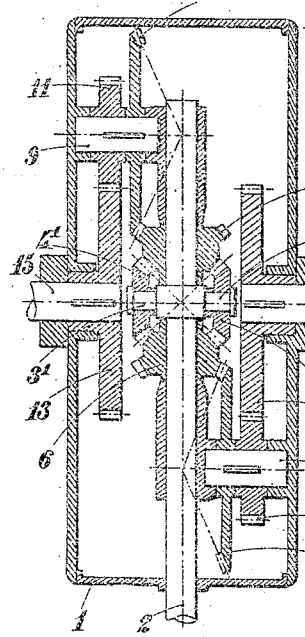
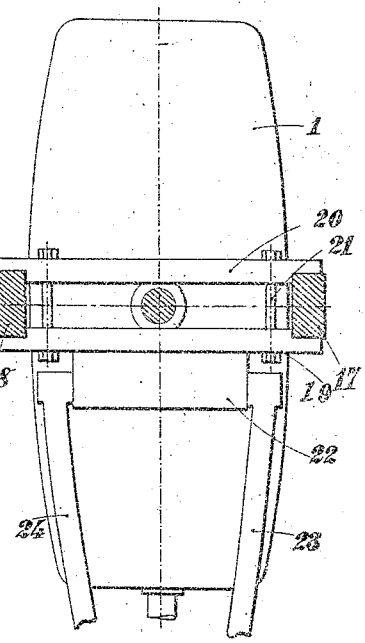
Witnesses:
E. C. Schuermann
N. M. Donn
Inventor:
Louis Renault
by

UNITED STATES PATENT OFFICE.

LOUIS RENAULT, OF BILLANCOURT, FRANCE.

TRANSMISSION-GEARING.

1,033,618. Specification of Letters Patent. Patented July 23, 1912.

Application filed July 20, 1910. Serial No. 572,842.

*To all whom it may concern:*

Be it known that I, LOUIS RENAULT, citizen of the French Republic, residing at Billancourt, Department of the Seine, in France, have invented certain new and useful Improvements in and Relating to Transmission-Gearing; and I do hereby declare the following to be a full, clear, and exact description of the invention, such as will enable others skilled in the art to which it appertains to make and use the same.

The invention has for its object a reducing gearing combined with a differential gearing and intended particularly for transmitting the motive power to the wheels of vehicles.

This device is more particularly applicable to heavy vehicles in which it is necessary to have very strong parts and in which the speed of the rear wheels must be largely reduced relatively to the speed of the motor.

The accompanying drawing shows an embodiment of the invention by way of example.

Figure 1 is a horizontal section of the device. Fig. 2 is an external side elevation of same.

The transmission shaft 2 extending from the motor passes through the change speed gear box and enters a casing 1 connected with the framework as hereinafter explained. The shaft 2 carries trunnions 3, 3' upon which the bevel wheels 4, 4' rotate idly. The latter mesh with other bevel pinions 5, 6 mounted loosely upon the shaft 2. Each of the pinions 5 and 6 carries two sets of teeth, one meshing with the pinions 4 and 4' and the other meshing with one of the gears 7 and 8, the shafts 9, 10 of which are perpendicular to the shaft 2 and connected with the gear case 1. Upon these shafts 9, 10 there are likewise mounted spur pinions 11, 12 rigidly connected with the gears 7, 8. The spur pinions mesh with gears 13, 14 keyed on the ends of the shafts 15, 16 carrying the wheels.

The different members of the device described above are completed by the necessary sleeves, brackets, bearings, etc., either plain or ball bearings and by packing rings or washers which may be useful for retaining the lubricant in the casing 1 and insure the efficient lubrication of the various parts.

The operation will be obvious. When running in a straight line the pinions 4, 4', 5, 6 as a whole rotate with the shaft 2 at the same speed; the gears 7 and 8 rotate at a reduced speed in accordance with the ratio of the teeth 5, 7 and 6, 8 and the wheels are driven simultaneously at a reduced speed according to the ratio of the pinions 11 and 12 and of the gears meshing with them. In turning curves the pinions 4, 4', 5, 6 as a whole operate as an ordinary differential and the wheels rotate at different speeds without slipping on the ground.

The device is strong; it enables very strong teeth to be formed on the pinions without rendering the apparatus bulky and presents the advantage that the members of the differential are mounted upon the shaft 2 that is to say upon the part which is given the most rapid movement of rotation.

In the construction shown in the drawing, the casing 1 and the mechanism that it contains are rigidly connected with the rear axle. This axle is preferably formed as an integral structure bowed or separated at the middle to form upper and lower sections or branches 17, 18. On each side, the casing carries a part 19 which is fitted to the upper and lower parts or branches 17, 18, respectively and which is bolted by means of bolts 21 to a cross piece 20, the parts 17, 18 being clamped between the ends of the opposing cross members 19, 20.

Without limiting myself to the construction shown, I claim:

1. In a reducing differential gearing for vehicles, the combination of a driving shaft, differential pinions thereon, pinions rotatable on said shaft in mesh with said first named pinions, gears meshing with said last named pinions, shaft sections, and reducing gears interposed between the respective gears and the respective shaft sections.

2. In a reducing differential gearing for vehicles, the combination with the axle shafts to be driven, of spur pinions, carried by said shafts, smaller spur pinions in mesh with said first named pinions, gears rotatable with the smaller pinions, a driving shaft, bevel pinions rotatable thereon and in mesh with the respective gears, and differential bevel pinions fixed to said shaft between said first named bevel pinions and in mesh with the same.

In testimony whereof I affix my signature, in presence of two witnesses.

LOUIS RENAULT.

Witnesses:
 DEAN B. MASON,
 GEORGES BOUJE.